United States Patent Office.

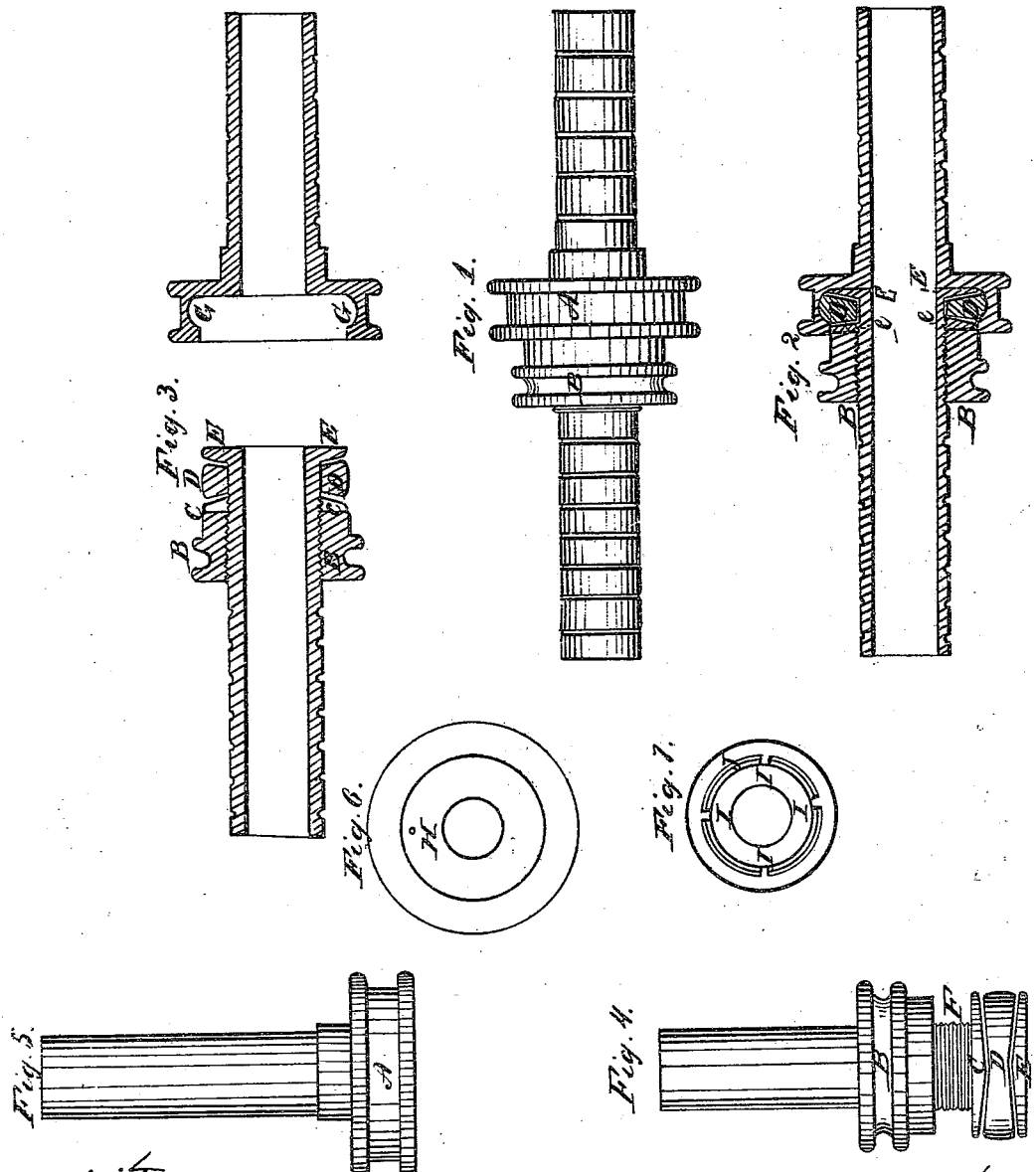

PETER H. NILES, OF BOSTON, ASSIGNOR TO HIMSELF AND AUGUSTUS RUSS, OF CAMBRIDGE, MASSACHUSETTS.

Letters Patent No. 68,380, dated September 3, 1867.

IMPROVEMENT IN HOSE-COUPLINGS.

The Schedule referred to in these Letters Patent and making part of the same.

Be it known that I, PETER H. NILES, of Boston, in the county of Suffolk, and State of Massachusetts, have invented a new and useful Improvement in Couplings for Hose and other Tubing; and I do hereby declare that the following is a full and exact description thereof, reference being had to the accompanying drawings, and to the letters of reference marked thereon.

To enable others skilled in the art to make and use my invention, I will proceed to describe its construction and operation. Upon the accompanying drawing—

Figure 1 is an elevation of the coupling as connected.

Figure 2 is a sectional view of the same.

Figure 3 is a section of each of the two parts of the coupling disconnected.

Figure 4 is an elevation of the male portion of the coupling with the nut run back, showing the screw.

Figure 5 is an elevation of the female portion of the coupling.

Figures 6 and 7 are plans of the male and female portions of the coupling.

Upon the body of the male section of the coupling is cut a screw, F, upon which the nut B travels, as shown in fig. 4. Turning this nut B forward, it presses against the washer C, which is forced against the ring D, made of rubber or other elastic material, and held in position by the flange E, as shown in fig. 2. The inner faces of both flange E and washer C are convex, and coincide with the sides of the elastic ring D, which are slightly concave, imparting an easy movement to the ring in expanding. Turning the nut B backward, the pressure is removed from the washer, ring, and flanges; the ring D contracts, and resumes its original size, which allows the male and female sections to be readily detached. The pin H, shown in fig. 6, in connection with the stop I, in the groove J, in fig. 7, prevents the male and female sections from acting independently, and holds the two sections in position while the nut B performs its office.

I claim the construction of a self-packing coupling, composed of an elastic ring, expanded into a recess in the opposite section of the coupling by means substantially as described.

I claim the expanding ring D, in conformation with the recess G, forming a self-packing coupling, substantially as above described.

I claim the ring D, nut B, washer C, and flange E, acting in combination, substantially as above described.

P. H. NILES.

Witnesses:
 J. M. F. HOWARD,
 M. H. DURGIN.